T. R. FORLAND.
SEPARATION OF MOLYBDENUM ORES.
APPLICATION FILED APR. 4, 1918.
1,308,735.
Patented July 1, 1919.
2 SHEETS—SHEET 1.
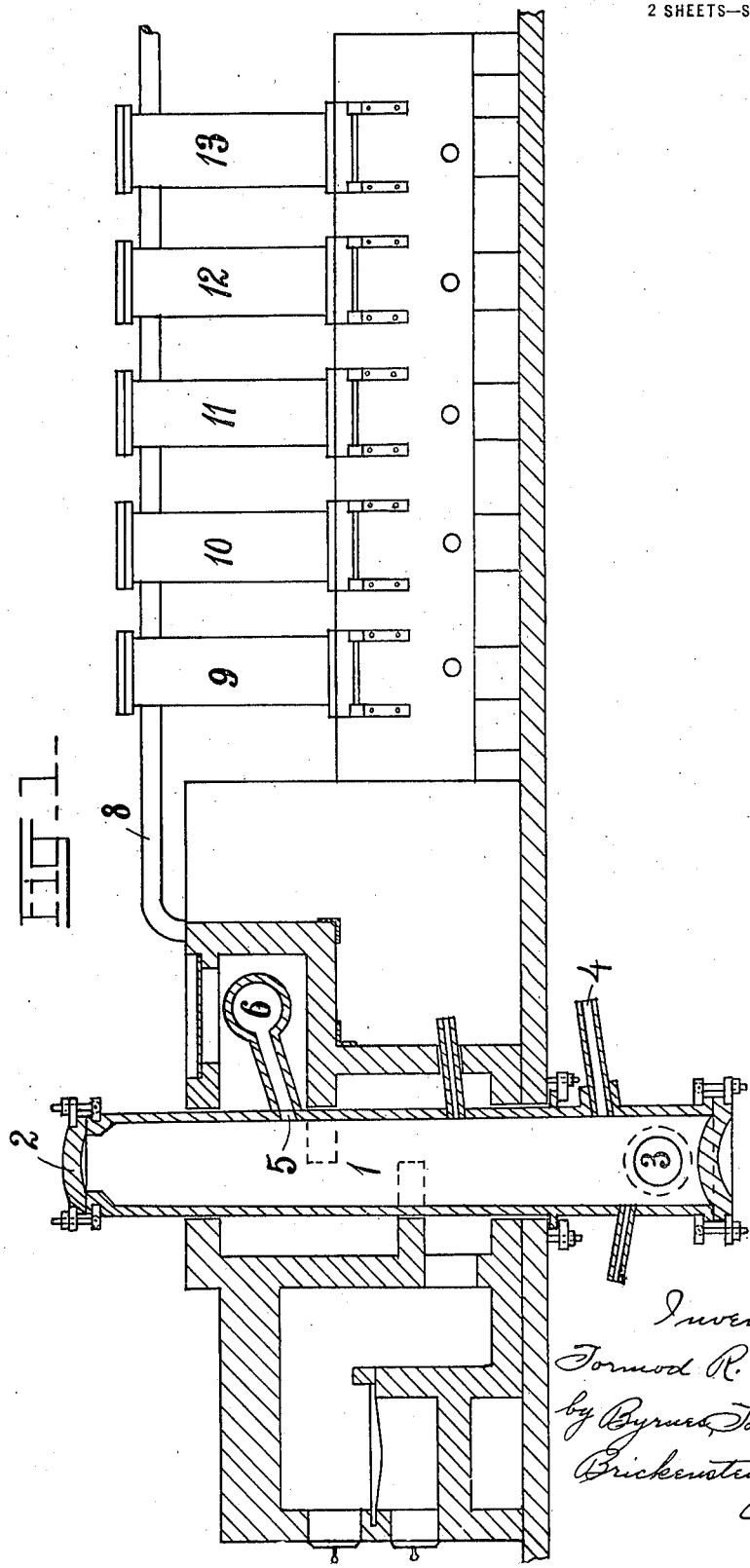

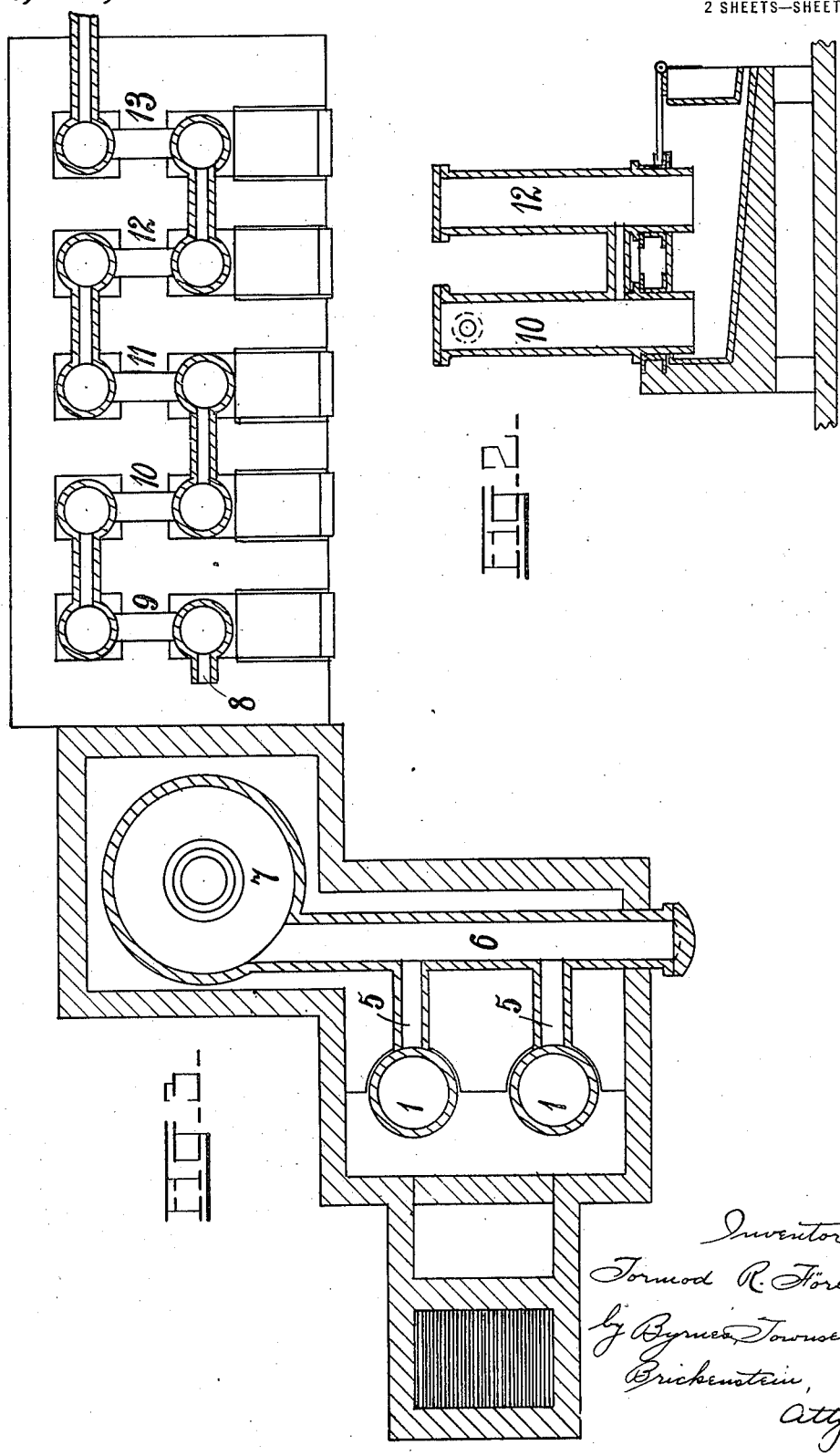

UNITED STATES PATENT OFFICE.

TORMOD REINERT FÖRLAND, OF HAUGESUND, NORWAY.

SEPARATION OF MOLYBDENUM ORES.

1,308,735.  Specification of Letters Patent.  Patented July 1, 1919.

Application filed April 4, 1918. Serial No. 226,747.

*To all whom it may concern:*

Be it known that I, TORMOD REINERT FÖRLAND, a subject of the King of Norway, residing at Haugesund, in the Kingdom of Norway, have invented certain new and useful Improvements in the Separation of Molybdenum Ores; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object a process for the separation of molybdenum from accompanying gangue matter and from compounds of other metals sulfids, oxids and the like contained in sulfid molybdenum ores or other ores or products containing molybdenum.

As is well known molybdenum is a metal of high value and an efficient separation of the molybdenum ores is for this reason of great importance.

In nature molybdenum mostly occurs in the form of molybdenite—sulfid of molybdenum, $MoS_2$—and generally the larger deposits consist of low grade ore containing about 3 per cent. or less of molybdenum. It is a matter of course, that the separation or dressing methods which are generally used for the separation of ordinary ores such as iron pyrite, copper pyrites, zinc blende, galena and other ores, and which may be designated as mechanical separation methods, for instance the various washing processes, "the Elemore process" the "Mineral separation" process and the like, which all allow of a greater or less percentage of metal in the gangue are not suitable for the treatment of a molybdenite especially when containing a low percentage of molybdenum. The fact is that even the most efficient ones of the usual separation methods will produce a gangue containing considerably more than 0.5 per cent. of $MoS_2$ and frequently up to 1 per cent. and more.

Moreover by most of the usual separation methods compounds of other metals—such as sulfids or oxids—when present in the ore will to a great part accompany the molybdenum concentrate and effect a decrease in the value of the same. Further an absolute concentrate is usually not obtained, considerable quantities of gangue matter being obtained in the concentrate. The degree of concentration will in most cases vary between 60 and 90 per cent. of $MoS_2$ in the concentrate a considerably greater loss of $MoS_2$ in the gangue taking place in connection with the more high grade concentrate.

The present invention is based upon the observation that by the use of a chemical-physical separation process it is possible to obtain a separation of practically the whole quantity of molybdenum from the other constituents of the ore so that "tailings" containing only traces of molybdenum and a concentrate containing practically no other matter besides the molybdenum compound will result.

According to the present invention this result is obtained by treating the finely comminuted molybdenum ore or ore or other material containing molybdenum with chlorin at a suitable temperature above 268° C., so as to convert the molybdenum into a chlorid, which distils off and is condensed as such.

It is known that chlorid of molybdenum is obtained when chlorin is passed over sulfid of molybdenum but it is not known to make use of this reaction in the manner suggested by me and for the purpose of effecting a practically complete separation of molybdenum ores or products.

I have made the discovery that when the treatment with chlorin is carried out at a suitable temperature and in a suitable manner preferably according to the counter current principle it is possible to obtain a practically complete conversion into chlorid so that the process becomes profitable and allows of a practically complete separation of the valuable metal. It has been found that in order to obtain a complete conversion and separation the treatment with chlorin should be carried out at temperatures above 268° C.

It has also been found to be of advantage, to subject the ore and the chlorin to drying before they are brought into contact with one another. Such drying is however not absolutely necessary the output being only slightly reduced when the drying is dispensed with.

It has been ascertained by experiments that as regards the comminution of the ore it is in most cases sufficient to bring the size of the particles down to about 1–2 mm. In general the ore should be so finely comminuted that the chlorin gas enters into contact with every particle of molybdenite.

When the ore to be treated contains other metals than molybdenum such as lead, zinc, copper, etc., the temperature is suitably controlled in such a manner that the metal chlorids having a higher boiling point remain in the tailings from which they may be subsequently recovered by means of a leaching operation, while chlorids having lower boiling points are separated from one another by means of fractional condensation.

Instead of subjecting the ore to a direct treatment with chlorin gas it may be of advantage in some instances to combine this treatment with a separation according to the methods at present employed this separation being then suitably carried so far as to produce a concentrate containing about 40-50 per cent. which is then subjected to the described chemical-physical separation treatment.

An apparatus for conveniently carrying out the process just described is shown in the accompanying drawings, in which:—

Figure 1 is a side view partly in section of a plant for use in carrying the invention into effect.

Fig. 2 is a transverse sectional view of the plant.

Fig. 3 is a horizontal sectional view of the same plant.

In the illustrated example 1 is a long vertically arranged retort into which the molybdenum ore (concentrate or crude ore) is introduced from above at 2. The residuum is removed at 3. Chlorin is introduced under pressure at 4 and forces its way through the charge. The chlorids formed escape at 5. The operation is now conducted in the manner, that the ore in the top part of the retort preferably somewhat below the outlet 5 is unaltered, while the portion of the charge near the chlorin inlet 4 is free from molybdenum. Thus the fresh chlorin entering the retort will first get into contact with the residuum which does not contain metal and will be heated thereby, then it reaches ore which is nearly free from metal and in the top the metals will be completely converted into chlorids. The chlorid of sulfur produced reacts with the ore and forms metal chlorid and free sulfur, which distils off together with the chlorids. The gases containing the metal chlorids and sulfur pass from the outlet 5 into the collecting channel 6 and therefrom to a vessel 7. From this point they pass through pipes 8 to the condensation plant, which is composed of five sections 9, 10, 11, 12 and 13.

The retort 1 is charged with fresh material in proportion as the treated material is removed and thus the ore will pass through the retort in opposite direction (counter current) to that of the gas.

I claim:

1. Process of treating sulfid ores of molybdenum, which consists in passing a current of chlorin gas at a temperature above 268° C. in contact with the ore and condensing the resulting vapors of chlorid of molybdenum.

2. Process of treating sulfid ores of molybdenum, which consists in passing in contact with a rich concentrate of the ore a current of chlorin gas at a temperature above 268° C. and condensing the resulting vapors of the chlorid of molybdenum.

In testimony that I claim the foregoing as my invention, I have signed my name in presence of two subscribing witnesses.

TORMOD REINERT FÖRLAND.

Witnesses:
 HENRY C. A. DAMM,
 M. RISER.